Patented Jan. 18, 1944

2,339,428

UNITED STATES PATENT OFFICE 2,339,428

PARTIAL GLYCERIN ESTER OF POLYMERIZED ROSIN AND METHOD OF MAKING THE SAME

Alfred L. Rummelsburg, Wilmington, Del., assignor to Hercules Powder Company, Wilmington, Del., a corporation of Delaware No Drawing. Application December 31, 1940, Serial No. 372,490

10 Claims. (Cl. 260—104)

This invention relates to a partial glycerin ester of a polymerized rosin adapted for utilization in a lacquer for coating transparent wrapping sheets of regenerated cellulose and to a method of production of such an ester.

Transparent wrapping sheets have heretofore been provided with surface films of cellulose derivative compositions such as compositions embodying cellulose nitrate, a resin and a plasticizer, and where moisture-proofness is desired, a wax or waxy material, the purpose of this coating being to enhance the utility of the wrapping sheet and to impart to it desired resistance to transmission of water either in liquid or in vapor form. In my copending application, Serial No. 343,166, filed June 29, 1940, there is disclosed the use of straight polymerized rosin having an acid number of less than about 140 and preferably ranging from about 100 to about 135, as the resinous component of such compositions, the use of such low acid number polymerized rosin having proved advantageous because it yields a film which is clear and haze-free even after the expiration of a long period of time. However, it is difficult and expensive to prepare polymerized rosin having an acid number within the range described in said application.

It is an object of the present invention to provide a resin embodying high acid number polymerized rosin but free from the tendency to impart haze to a transparent cellulose derivative composition. Another object is to provide a process for making such a resinous material from high acid number polymerized rosin.

I have discovered that polymerized rosin having, when manufactured, an acid number above 140, the acid number of which has been reduced to between about 60 and about 125 by partial esterification with glycerin, displays freedom from haze-forming tendency when incorporated in a transparent cellulose derivative composition such as transparent lacquer for coating transparent wrapping sheets or the like. At the same time, this resinous material shows a sufficient moisture resistance. Polymerized rosin which has been substantially completely esterified with glycerin, say to an acid number of 25 or lower, while imparting good gloss and adhesion to the lacquer, does not possess adequate resistance to water or moisture. Since it is much easier and more economical to prepare high acid number polymerized rosin and to partially esterify it to an acid number between about 60 and about 125, then to make polymerized rosin of low acid number, the present invention is advantageous. Moreover, the partial glycerin ester of high acid number polymerized rosin in general shows a higher melting point and greater hardness than low acid number polymerized rosin, with the result that the resulting coating is more satisfactory and more tack-free.

The present invention may be carried out by esterifying polymerized rosin having an acid number above 140 and which would impart an objectionable haze to a transparent cellulose derivative lacquer, with from about 2% to about 5% by weight of glycerin based on the weight of polymerized rosin. For the substantially complete esterification of polymerized rosin, it is customary to employ 12% of its weight of glycerin. Therefore, it will be seen that the present invention involves the use of from about 17% to about 42% by weight of the glycerin normally used for substantially complete esterification. Complete reaction of high acid number polymerized rosin with 5% of its weight of glycerin gives an acid number of about 60. Complete esterification of high acid number polymerized rosin with 2% of its weight of glycerin gives an acid number of about 125. The resins prepared with quantities of glycerin materially on either side of this range do not show advantageous properties in transparent wrapping sheet lacquer. Thus, the use of less than 2% of glycerin results in the production of an objectionable haze in the coating. The use of more than 5% of glycerin results in the production of a film which has very poor moisture resistance.

The partial glycerin esters may be prepared by heating a mixture of polymerized rosin with the requisite amount of glycerin at a temperature of about 270° C. for a period of time sufficient to bring about substantially complete reaction of the glycerin with the polymerized rosin. Normally, this period of time will be at least 3.5 hours. Preferably, the reaction is carried out under an air condenser, and in the presence of an inert atmosphere such as carbon dioxide, produced for example by bubbling inert gas through the reaction mixture.

The lacquer in accordance with the present invention may comprise a cellulose derivative and the partial glycerin ester prepared as above, as its principal film-forming ingredients. However, the lacquer may in addition desirably embody substantial proportions of a wax or waxy material and a suitable plasticizer.

In order to form the lacquer, the film-forming ingredients which are relatively non-volatile are dissolved in a suitable quantity of a suitable volatile organic solvent. The resulting lacquer is then applied to the transparent base as, for example, to one or both sides of a transparent wrapping sheet of regenerated cellulose in any suitable manner as for example by roll coating, spraying, brushing, flowing, etc. after which the wet film is dried to remove the volatile solvents and form the final product. If desired, the coated base may be subjected to an elevated temperature sufficient to melt the wax in the composition and simultaneously volatilize residual solvent.

As the transparent base to which the lacquer is applied, I may use any transparent base which is preferably insoluble in the usual lacquer solvents, such as glass, transparent regenerated cellulose articles such as regenerated cellulose sheeting, gelatin sheeting, casein sheeting, cellulose acetate sheeting, rubber hydrochloride sheeting, etc. However, the invention is particularly applicable to regenerated cellulose sheeting because such sheeting without lacquer coating is extremely lustreless and permeable to the transmission of water.

As the cellulose derivative, it is preferred to employ nitrocellulose of a grade which gives the desired viscosity in the resulting lacquer. Mixtures of several grades of nitrocellulose of this viscosity may be used if desired. I have found it particularly advantageous to employ nitrocellulose of one-half second viscosity. Instead of using nitrocellulose, other cellulose derivatives may less preferably be employed, such as ethyl cellulose, benzyl cellulose, cellulose acetate, cellulose acetate butyrate, cellulose acetate propionate and the like.

The range of cellulose derivatives may vary within quite wide limits, for example, from about 25% to about 60% by weight of total solids in the composition, although it is preferred to employ between about 40% and about 50% of nitrocellulose.

If desired, the partially esterified glycerin ester of polymerized rosin may be treated to remove traces of light ends, such as rosin oil and the like. These light ends are objectionable in that they cause the resin to impart an undesirable tackiness to the resulting film. These light ends may be removed from the ester by heating at reduced pressure, for example, at about 1 mm. pressure and 240–280° C. or higher, under which conditions oils and also unpolymerized rosin can be removed by distillation. Alternatively, the polymerized rosin before esterification may be treated in this manner to remove rosin oils and unpolymerized rosin. The polymerized rosin which is esterified may be polymerized in any suitable manner as, for example, by means of sulfuric acid, phosphoric acid, tetraphosphoric acid, hydrofluoric acid, boron trifluoride, amphoteric metal halides, etc. The polymerized rosin may have been, or the partial glycerin ester thereof may be, further refined in any desired manner for example, by means of selective solvents such as furfural, etc.; selective adsorbents such as fuller's earth, etc., to reduce its color to the desired figure. It may also have been heat treated at 250–325° C., desirably in an inert atmosphere, to bleach its color. If desired, the partial glycerin ester of polymerized rosin may be prepared by polymerizing the partial glycerin ester of rosin by any of the methods known to the art. Instead of employing rosin itself as the original starting material for the partial glycerin ester of polymerized rosin, I may use equivalent rosin acids such as abietic acid, pimaric acid, sapinic acid, etc. The original rosin may be refined or unrefined, heat treated, partially distilled, etc.

The amount of partial glycerin ester of acid number from 60 to 125 used in the lacquer may vary within relatively wide limits as, for example, from about 20% to about 60% by weight of the total solids in the lacquer. Within this range, it is preferred to employ between about 30% and about 40% by weight of the partial ester. It has been found that the employment of the partial ester of polymerized rosin in the lacquer in these amounts produces a film which overcomes the disadvantages of prior art lacquers wherein the resinous component was rosin or ester gum. The partial ester of polymerized rosin is completely compatible with the cellulose derivative, and with the wax or waxy material, both in the formulation of the lacquer and in the resulting dried coating.

It is preferred to employ a wax or wax-like material in the lacquer composition in order to impart moisture-proof properties to the wrapping sheet coated with the lacquer. In this specification, and in the claims appended hereto, I use the term "wax" to designate any suitable waxes such as true waxes, or paraffin wax, or equivalent wax or wax-like materials which have the property of imparting water-proofness to the lacquer. It is preferred to use paraffin wax of relatively high melting point (at least 55° C.). However, other waxes may be employed such as for example, carnauba wax, spermaceti, wool wax, beeswax, Japan wax, Chinese insect wax, psylla wax, Montan wax, palm, sugar cane wax, pisang wax, candelilla, cottonseed wax, gondang wax, pimela wax, Bayberry wax, etc. and similar waxy materials such as tallow, waxy chlorinated naphthalenes (Halowax), palmitic acid, stearic acid stearin, ceresin, ozokerite, synthetic waxes such as "opal wax," petroleum jelly, etc. The amount of wax employed may vary between about 1% and about 20% by weight of total solids in the lacquer and preferably within the limits of between about 5% and about 10% by weight.

It is preferable to incorporate into the lacquer a plasticizer of suitable type such as, for example, from about 5% to about 40% of one of the following plasticizers or mixtures thereof, having regard to the particular cellulose derivative present in the formulation: dibutyl phthalate, dimethyl phthalate, diethyl phthalate, diamyl phthalate, cyclohexyl phthalate, benzyl phthalate, dibutyl tartrate, diamyl tartrate, ethyl abietate, benzyl abietate, diacetin, triacetin, sucrose octo-acetate, triethanolamine, acetanilide, methyl benzoate, ethyl benzoate, benzyl benzoate, phenyl benzoate, naphthyl benzoate, glyceryl benzoate, triethyl citrate, tributyl citrate, dibenzyl ether, butyl stearate, triphenyl borate, methyl phthalyl ethyl glycollate, butyl phthalyl butyl glycollate, ethyl phthalyl ethyl glycollate, triphenyl phosphate, tricresyl phosphate, camphor, blown castor oil, etc.

If desired, a suitable dye or soluble dyestuff may be incorporated in the lacquer provided it does not materially reduce the transparency of the lacquer or the film made therefrom.

The foregoing non-volatile constituents are dissolved in a suitable solvent therefor, it being preferred to employ mixtures of solvents, to form a lacquer of the desired consistency for application by the particular method to be used. Any of the known lacquer solvents may be employed. Particularly satisfactory results have been obtained by using a mixture of butyl acetate, ethyl acetate, ethyl alcohol, butyl alcohol and toluene in various proportions. The principles of formulating the lacquer solvent mixture are well understood to those skilled in the art, it being recognized that a solvent mixture should be employed which gives a suitable drying rate and which does not adversely affect the properties of the resulting solid film. It is particularly important to avoid condensation of moisture upon the lacquer film during evaporation of the solvents and to use solvents which do not cause blushing or clouding of the film as the solvents evaporate. As solvents, there may be employed any of the known lacquer solvents such as alcohols, ketones, esters, hydrocarbons, ethers, halogenated hydrocarbons, nitro paraffins, or mixtures of the foregoing solvents, etc. The concentration of non-volatile or film-forming ingredients in the lacquer will depend upon the consistency desired and may vary, for example, from 10 to 50% and preferably from 20 to 25%. For example, I have found that use of a lacquer containing 22% of total solids results in a composition of such consistency that it may be readily applied by the usual coating methods to form a thin film which imparts the desired properties to the base.

In some cases, the composition may be applied to the base in the form of a hot melt of the solids of the composition, no or only a very small amount of volatile organic solvent being employed.

Below are given several specific examples illustrating the present invention. The polymerized rosin referred to in certain of these examples had been polymerized with sulfuric acid and had the following characteristics:

Acid number _____ 162
Drop melting point_____°C__ 109
Color _____ I

*Example 1*

Three hundred grams of sulfuric acid polymerized gum rosin having an acid number of 162, and a melting point of 109° C. was heated with 15 g. of glycerin to 270° C. for 3.5 hours under an air condenser. $CO_2$ was bubbled through the reaction mixture throughout. The partial glycerin ester so produced displayed the following characteristics:

Acid number _____ 68
Drop melting point_____°C__ 124
Color _____ M

*Example 2*

A lacquer was formulated with the partial ester of polymerized rosin prepared in accordance with Example 1, as follows:

| | Parts by weight | Per cent of total solids |
|---|---|---|
| Nitrocellulose (½ second) | 10 | 45.5 |
| Partial ester of Example 1 | 8 | 36.3 |
| Dibutyl phthalate | 4 | 18.2 |
| Solvent | 78 | |

The solvent employed in this formulation had the following composition:

| | Per cent by weight |
|---|---|
| Butyl acetate | 25 |
| Ethyl acetate | 5 |
| Ethyl alcohol | 5 |
| Butyl alcohol | 15 |
| Toluene | 50 |

The lacquer was applied to one side of a regenerated cellulose sheet in the form of a thin film. Upon evaporation of the solvent, there was obtained a sheet of high brilliance and gloss, the dried film being haze-free even after a long period of time.

*Example 3*

The lacquer of Example 2 was applied to a smooth glass surface. The dried film exhibited permanent freedom from haze.

*Example 4*

| | Parts by weight | Per cent of total solids |
|---|---|---|
| Nitrocellulose (½ second) | 10 | 41.7 |
| Partial ester of Example 1 | 8 | 33.3 |
| Paraffin wax (melting point 68° C.) | 2 | 8.3 |
| Dibutyl phthalate | 4 | 16.7 |
| Solvent (same as in Example 2) | 76 | |

The lacquer was applied in the form of a thin even film to the surface of a regenerated cellulose sheet. By evaporation, there was obtained a highly moisture-proof regenerated cellulose wrapping material of excellent transparency and brilliancy and which was permanently free from haze.

*Example 5*

The lacquer of Example 4 was applied to a glass surface. Upon evaporation a haze-free film of excellent characteristics was obtained.

*Example 6*

Three hundred grams of sulfuric acid polymerized gum rosin having an acid number of 162 and a drop melting point of 109° C. was heated with six grams of glycerin to 270° C. for five hours under an air condenser, $CO_2$ being bubbled through the reaction mixture throughout. The product was incorporated in the lacquers of Examples 2 to 5 and employed in the same manner with the same results. It was noted, however, that if the reaction period was from 1 to 3.5 hours, incomplete combination of the glycerin with the polymerized rosin occurred and the resulting ester imparted an objectionable haze to lacquer and lacquer films prepared therewith. Where 5% of glycerin was employed as in Example 1, the use of a reaction period of 3.5 hours or more, for example, 5 hours, resulted in a resin imparting no haze, although a reaction period of less than 3.5 hours, for example of 1 to 2 hours, resulted in a haze being imparted to the lacquer.

From the foregoing, it will be seen that the present invention provides a highly improved resinous material for incorporation in transparent lacquer and the like, provides a process of making such an improved resinous material, provides an improved lacquer for application to transparent bases, and an improved transparent article coated with such a lacquer, such as transparent regenerated cellulose coated therewith. The present invention enables the convenient and economical use of polymerized rosin in this field without causing the objectionable development of haze in the film. Numerous other advantages of the present invention will be apparent to those skilled in the art.

A wholly unexpected feature of this invention is that the operable range of acid number is lower when the acid number is reduced by partial esterification with glycerin than when straight polymerized rosin of low acid number is employed.

It will be understood that the details and examples hereinbefore set forth are illustrative only and that the invention as broadly described and claimed is in no way limited thereby.

What I claim and desire to protect by Letters Patent is:

1. The process which comprises reducing the acid number of polymerized rosin having an acid number of at least about 140 to between about 60 and about 125 by partially esterifying said polymerized rosin with from about 2% to about 5% by weight of glycerin.

2. A process for the controlled reduction of the acid number of polymerized rosin of the type having an acid number above 140 which comprises heating the said polymerized rosin at esterification temperatures with between about 2% and about 5% of glycerin until the acid number of the polymerized rosin has been reduced to a value between 125 and 60.

3. A process for the controlled reduction of the acid number of polymerized rosin of the type having an acid number above 140 which comprises heating the said polymerized rosin at esterification temperatures with between about 2% and about 5% of glycerin until the acid number of the polymerized rosin has been reduced below 125 and the glycerin has been substantially completely reacted with the rosin.

4. A process for the controlled reduction of the acid number of polymerized rosin of the type having an acid number above 140 which comprises heating the said polymerized rosin at a temperature of about 270° C. with between about 2% and about 5% of glycerin until the acid number of the polymerized rosin has been reduced to a value between 125 and 60.

5. A process for preparing a polymerized rosin product which comprises heating a plymerized rosin having an acid number above about 140 at esterification temperatures with between about 2% and about 5% of glycerin until the acid number of the polymerized rosin has been reduced to a value between about 125 and about 60 and subjecting the resulting ester to vacuum distillation to remove volatile components.

6. As a new article of manufacture, a partial glycerin ester of a polymerized rosin of acid number of at least about 140, said ester having an acid number of between about 60 and about 125.

7. As a new article of manufacture, a partial glycerin ester of a polymerized rosin of acid number of at least about 140, said ester having an acid number of between about 60 and about 125, and being characterized by freedom from haze-forming tendencies and excellent moisture-resistance when incorporated in a transparent cellulose derivative composition.

8. As a new article of manufacture, a partial glycerin ester of a polymerized rosin of acid number of at least about 140, said ester having an acid number of about 60.

9. As a new article of manufacture, a partial glycerin ester of a polymerized rosin of acid number of at least about 140, said ester having an acid number of about 125.

10. As a new article of manufacture, a partial glycerin ester of a polymerized rosin of acid number of at least about 140, said ester having an acid number of between about 60 and about 125 and being substantially free from tack-forming impurities.

ALFRED L. RUMMELSBURG.